United States Patent [19]

Collier

[11] 4,401,099
[45] Aug. 30, 1983

[54] SINGLE-ENDED RECUPERATIVE RADIANT TUBE ASSEMBLY AND METHOD

[75] Inventor: David W. Collier, Cannock, England

[73] Assignee: W.B. Combustion, Inc., Hales Corner, Wis.

[21] Appl. No.: 167,413

[22] Filed: Jul. 11, 1980

[51] Int. Cl.³ .............................................. F24C 3/00
[52] U.S. Cl. .................................... 126/91 A; 431/9; 431/215; 431/353
[58] Field of Search ............... 126/91, 91 A; 431/353, 431/9, 215; 432/209, 223

[56] References Cited

U.S. PATENT DOCUMENTS

| | | |
|---|---|---|
| 2,902,270 | 9/1959 | Salomonsson et al. ............ 126/91 R |
| 3,688,760 | 9/1972 | Rudin ............................... 126/91 A |
| 4,047,881 | 9/1977 | Main et al. ........................ 126/91 A |
| 4,097,223 | 6/1978 | Garner ................................ 431/353 |
| 4,098,255 | 7/1978 | Nowak et al. .................... 126/91 A |
| 4,255,124 | 3/1981 | Baranowski, Jr. ................. 431/353 |

FOREIGN PATENT DOCUMENTS

| | | | |
|---|---|---|---|
| 2165172 | 7/1972 | Fed. Rep. of Germany ... | 126/91 A |
| 2243314 | 3/1974 | Fed. Rep. of Germany ... | 126/91 A |
| 1479144 | 7/1977 | United Kingdom ............. | 126/91 A |

Primary Examiner—Lee E. Barrett
Attorney, Agent, or Firm—Dressler, Goldsmith, Shore, Sutker & Milnamow

[57] ABSTRACT

A single-ended recuperative radiant tube assembly for increasing the efficiency of a combustion furnace system by using less fuel input per heat output than conventional systems. The single-ended recuperative radiant tube assembly has inner and outer recuperator tube assemblies positioned in a counterflow arrangement within a radiant tube assembly. Hot exhaust gases emitted from a burner within the single-ended radiant tube assembly are directed through a flame tube to an annular exhaust chamber located between the outer recuperator tube and radiant tube assemblies. Ambient air flowing towards the burner in an air chamber between the inner and outer recuperator tube assemblies is heated by the exhaust gases in the annular exhaust chamber.

23 Claims, 6 Drawing Figures

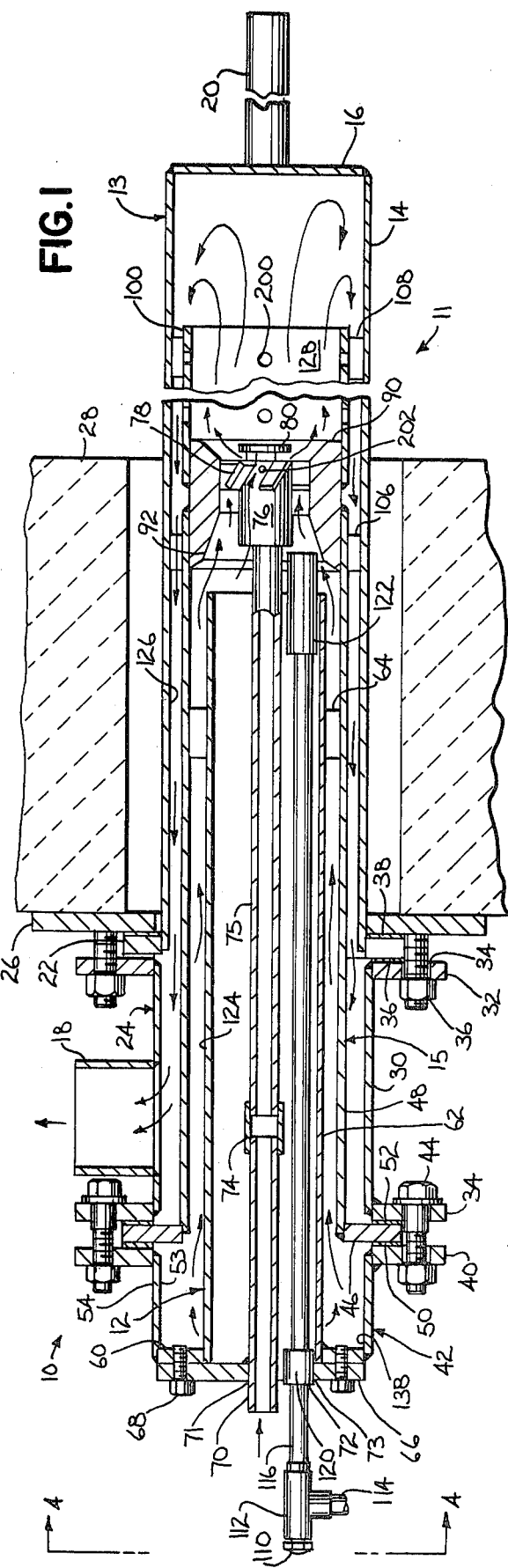

SINGLE-ENDED RECUPERATIVE RADIANT TUBE ASSEMBLY AND METHOD

TECHNICAL FIELD OF THE INVENTION

This invention relates to energy saving devices, and more particularly, to a single-ended recuperative radiant tube assembly and method for increasing the efficiency of furnaces so that gas input can be reduced while maintaining the same heat output.

BACKGROUND OF THE INVENTION

In many gas fired furnaces as much as 60 percent of the heat supplied is wasted because it is discharged up the exhaust stack before it is circulated or otherwise utilized for its intended purpose. This is a great loss of energy which is even more aggravating with the present scarcity of fuel in many of the major industrial countries.

While various heat exchangers, recuperators and other devices have been suggested to utilize this wasted gas, most of these prior art devices are complex, expensive and require major alterations to existing furnaces. While recuperators located externally of the combustion system have also been used, external recuperators are usually bulky and occupy valuable storage space. Typifying some of the many conventional heat exchangers and other prior art devices are those shown in British Pat. Nos. 1,010,870, 1,301,669 and 1,492,520.

It is therefore desirable to provide an improved apparatus which overcomes most, if not all, of the preceding problems.

SUMMARY OF THE INVENTION

A single-ended recuperative radiant tube assembly is provided to increase the overall efficiency of furnaces so that gas input can be reduced while maintaining the same heat output. The single-ended recuperative radiant tube assembly is efficient, effective, easy to install and relatively inexpensive. The single-ended recuperative radiant tube assembly can be installed directly to existing furnaces by replacing the furnace's conventional radiant tube with the single-ended recuperative tube assembly of this invention thereby avoiding substantial alterations to the furnace.

The single-ended recuperative radiant tube assembly not only serves as a recuperator but also as a self-contained combustion unit which can be furnished as original equipment for retrofit on existing furnaces. The single-ended recuperative radiant tube assembly features a recuperator and burner within a radiant tube assembly. The recuperator has an inner shroud recuperator tube assembly positioned within an outer recuperator tube assembly. The inner recuperator tube assembly surrounds, protects and thermally shields a gas inlet tube which feeds gas to the burner and prevents the gas inlet tube from overheating so as to reduce burner soot build-up, maintenance costs and down time.

The outer recuperative tube assembly has an outer recuperator tube which circumferentially surrounds the inner recuperative tube assembly and has a flame tube which extends from a position about the burner to a position spaced slightly away from the closed end of the radiant tube. Ambient air injected through the annular air chamber between the inner and outer recuperator tube is heated by the exhaust gases flowing in the annular exhaust chamber between the outer recuperator tube and radiant tube. In the preferred form the diameter of the outer recuperator tube assembly is reduced slightly upstream of the burner to increase the velocity of the heated air and direct the heated air to the burner. Desirably, the burner has fins to swirl the heated air before it is mixed with the gaseous burner fuel.

For radiant tube assemblies having a diameter of less than six inches, the flame tube is perforated to form apertures or exhaust ports for uniform discharge of heat to the exhaust chamber.

A more detailed explanation of the invention is provided in the following description and appended claims taken in conjunction with the accompanying drawings.

BRIEF DESCRIPTION OF THE DRAWINGS

FIG. 1 is a fragmentary cross-sectional view of a single-ended recuperative radiant tube assembly in accordance with principles of the present invention;

FIG. 2 is an enlarged cross-sectional view of the burner of the single-ended recuperative radiant tube assembly;

FIG. 3 is an end view of the burner taken substantially along line 3—3 of FIG. 2;

DETAILED DESCRIPTION OF THE PREFERRED EMBODIMENT

Figure 4:
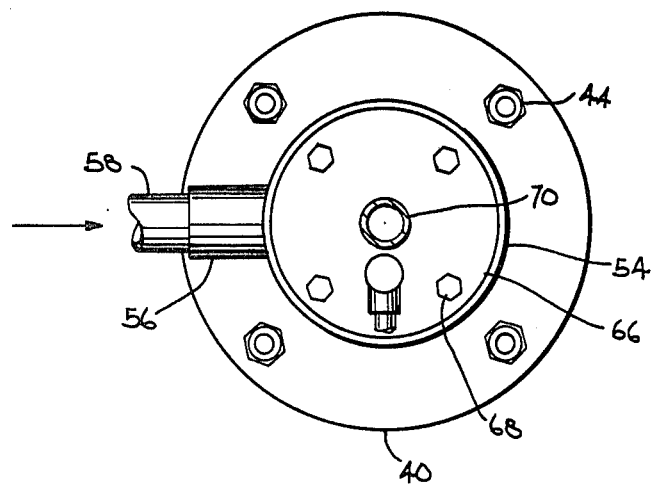
FIG. 4 is an end view of the single-ended recuperative radiant tube assembly taken substantially alone line 4—4 of FIG. 1.

Referring now to FIG. 1, a gas fired furnace combustion system 10 is equipped at its exhaust end with an internal single-ended recuperative radiant tube assembly 11, sometimes referred to as an "SER tube assembly". Single-ended recuperative radiant tube assembly 11 has a recuperator 12 concentrically positioned within a radiant tube assembly 13. Recuperator 12 includes an inner shroud recuperator tube assembly 62 concentrically positioned within an outer recuperator tube assembly 15. The outer recuperator tube assembly 15 has a main outer recuperator tube 48 which circumferentially surrounds inner recuperator tube assembly 62 and has a flame tube 100 which extends from a position about a burner 76 to a location spaced slightly away from the closed end 16 of radiant tube assembly. The radiant tube assembly 13 includes an external single-ended radiant tube or external radiation tube 14, an exhaust assembly or elbow 24 and an air inlet assembly 42.

Ambient air entering the air inlet assembly 42 is directed to the annular air chamber 124 between inner and outer recuperator tubes 62 and 48. Heat and exhaust gases generated and emitted from burner 76 are directed to the inner air flow passageway 128 of flame tube 100 where it is deflected from the closed end 16 of radiant tube 14 into the annular exhaust chamber 126 located between the outer recuperator tube assembly 15 and the outer radiant tube 14 and exhaust elbow 24 of radiant tube assembly 13. The hot exhaust gases in annular exhaust chamber 126 heat the ambient air in air chamber 124 before the air reaches burner 76.

Very little of the heat generated by burner 76 is used to heat the large quantities of air required for combustion, i.e., the ambient air in prior art systems often cool the burner flame. Preheating the air prior to combustion with the single-ended recuperative radiant tube assembly 11 increases the overall efficiency of the combustion system and enables the gas input to be reduced while maintaining the same heat output.

In the preferred embodiment, outer recuperator tube assembly 15 has a reduced diameter converging portion 92 which increases the velocity of the heated air and directs the heated air to burner 76. Burner 76 also has inclined fins 78 which promote swirling and turbulence of the heated air before the heated air is mixed with gaseous fuel from gas inlet line 75. Gas inlet line 75 is protected from being overheated by inner recuperator tube assembly 62.

Turning now to the specific interrelationships of the parts and components of the single-ended recuperative radiant tube assembly 11, outer radiant tube 14 has a disc-like closure plate 16 which provides a front end baffle, or deflector which deflects hot exhaust gases from inner flow passageway 128 to annular exhaust chamber or passageway 126. An axial mounting support rod 20 can be connected to cover plate 16. Radiant tube 14 has an annular flange 22 compressively clamped via bolts 36 between the annular flange 32 of gas exhaust outlet assembly or elbow 24 and an annular mounting flange 26 which is secured against furnace brickwork 28. Gaskets 36 and 38 fluidly seal flanges 32, 22 and 26, respectively.

Exhaust assembly 24 has a radially extending exhaust outlet tube 18 and a tubular body 30. The annular flange 46 of outer recuperator tube 62 is compressively clamped by bolts 44 between the exhaust outlet's rear flange 34 and the annular flange 40 of air inlet assembly 42. Gaskets 50 and 52 fluidly seal flanges 40, 46 and 34, respectively, together.

Air inlet assembly 42 has an axial main body portion 54 and an air inlet tube 56 (FIG. 4) which extends radially outward of main body portion 54. Air inlet tube 56 is connected to air inlet line 58 (FIG. 4). The space or cavity between inner recuperator tube 62 and main body portion 54 defines an annular air inlet chamber 53 which communicates with the annular air chamber 124 between inner and outer recuperator tubes 48 and 68.

A disc-like end plate 66 (FIGS. 1 and 4) closes the rearward end of inner recuperator tube 68 and is secured against the annular flange 60 of air inlet assembly 42 by bolts 68. Extending through a central opening 71 in end plate 66 is a centrally disposed gas inlet tube 70 which is welded or otherwise secured to end plate 66. A pilot ignition assembly 72 extends through an eccentric opening 73 in end plate 66.

Gas inlet tube 70 is connected via connector 74 to gas inlet discharge tube 75 which is connected to burner 76. Gas inlet tube 75 extends axially through the center or axis of inner recuperator tube 62. Gas inlet tube 75 and the part of inlet tube 70 which extends within inner recuperator tube 62 are thermally shielded and protected from overheating by inner recuperator tube 62 which if overheated would crack down and produce soot at the tip of burner 76. Gas inlet tube 75 directs and feeds gas fuel to burner 76.

In the preferred embodiment, a medium velocity burner 62 is used to fire down flame tube 100. Burner 62 has delayed mixing and uniform progressive combustion so as to enhance heat transfer. Advantageously, burner 76 has inclined, twisted radial fins or vanes 78 to enhance swirling and turbulence of the heated air before the heated air is mixed with the gaseous fuel. In the illustrative embodiment, there are six fins 78 (FIG. 3) which are spaced from each other about 60 degrees. Each of the fins 78 is inclined at a 30 degree angle. Burner 76 has a head 80 (FIG. 2) with a radial gas-emitting discharge gap or discharge opening 83 spanning a distance of 0.75 of the effective length of radiant tube 14. Head 80 has ribs 82 which are secured to the front jaws 84 of socket 86. Gas inlet tube assembly 75 is welded or otherwise secured into the rearward opening 88 of socket 86. Fins 78 extend outward from socket 86 and are connected to the central body portion 102 of swirler casting 90.

Swirling casting 90 has a reduced diameter, inwardly converging portion 92 including inwardly inclined portions 94 and 96 which direct the preheated air towards fins 78. The downstream end of swirler casting 90 has an outwardly diverging portion 98 which deflects the heat and exhaust gases into flame tube 100. The result of the above arrangement is to provide progressive combustion down flame tube 100 without excessive hot spots adjacent burner 76. Outer recuperator tube 48 and flame tube 100 are welded or otherwise secured to the outer external surface 104 of swirler casting 90.

A spoked mounting collar 106 is securely positioned between outer recuperator tube 48 and radiant tube 14 about the swirler casting's reduced diameter converging portion 92. Another spoked mounting collar 108 is securely positioned between the front end of flame tube 100 and radiant tube 14. Spoked mounting collars 106 and 108 cooperate with each other and clamped flange 46 to securely and concentrically position outer recuperator tube assembly 15 within radiant tube assembly 13.

Spoked mounting collar 64 is securely positioned between inner and outer recuperator tubes 62 and 48 at a location towards the front end of inner recuperator tube 62 and cooperates with bolted flange 60 to securely and concentrically position inner recuperator tube 62 within outer recuperator tube 48.

Referring now to pilot ignition assembly 72 (FIG. 1), pilot ignition assembly 72 has an observation port 110 positioned adjacent T-connector 112. Inlet tube 114 extends into connector 112 while outlet tube 116 extends axially outward of connector 112. A spacer 120 is positioned about outlet tube 116. A pilot ignition head 122 extends forwardly of outlet tube 116 beyond the front of inner recuperator tube 62 to a position slightly rearwardly of burner 76. Pilot ignition head 122 emits a blue pilot ignition flame about burner 76 to ignite to gas from gas inlet line 75.

The portion of the plug-in recuperator 12 extending along the length of inner recuperative tube 62 provides a recuperator section or heat exchanger section. Tubes 14, 48 and 62 have circular cross sections with generally smooth inner and outer surfaces without any fins to avoid soot formation which would otherwise create high maintenance problems.

The single-ended recuperative radiant tube assembly 11 provides a compact single pass counterflow recuperating heat exchanger which relies on radiation and conduction from hot waste exhaust gases flowing in annular exhaust chamber 126 to preheat the air in the annular air chamber 124. In order to enhance heat transfer, the cross-sectional area of annular exhaust chamber 126 should be from about 25 percent to about 35 percent of the cross-sectional area of radiant tube 14. Annular air chamber 124 should have a cross-sectional area between about 20 percent and about 30 percent of the cross-sectional area of inner recuperative tube.

Single-ended recuperative radiant tube assembly 11 is manufactured using heat resistant exhaust alloys for all surfaces exposed to high temperature exhaust gases and can be used at furnace temperatures as high as 1050 degrees C. Recuperator tubes 48 and 62 should be made of a thermally conductive metal having a melting temperature greater than the temperature of the exhaust gases. Such metals include various grades of iron/nickel/chromium or iron/chromium/nickel stainless steel alloys. These materials can be rolled to proper size and arc welded.

For example, outer recuperator tube 48 can be fabricated from an alloy, such as is commercially available under the trademark RA333 from Rolled Alloys Inc. in the United States, with a composition of 45 percent nickel, 25 percent chromium, 1.25 percent silicon, 3 percent molybdenum, 3 percent cobalt, 3 percent tungsten and 0.05 percent carbon. Outer recuperator tube 48 can also be fabricated from an alloy, commercially available under the trademark INCONEL ALLOY 601 from International Nickel Limited, with a composition of 60 percent nickel, 23 percent chromium, 1.5 percent aluminum and 0.1 percent carbon.

Radiant tube 14 can be fabricated from type 310 stainless steel having a composition from about 19 to about 22 percent nickel, from about 24 to about 26 percent chromium, with up to 1.5 percent silicon, up to 2 percent manganese and up to 0.25 percent carbon. Radiant tube 14 can also be fabricated of heat resisting steel, such as 3 mm. thick heat resisting steel commercially available under the trademark RA330 from Rolled Alloys, Inc., with a composition of 0.05 percent carbon, 1.5 percent manganese, 1.25 percent silicon, 19 percent chromium and 35 percent nickel. Exhaust elbow assembly 24 and air inlet assembly 42 can be fabricated from carbon steel. Other materials can be used for the above parts and components.

Single-ended recuperative radiant tube assembly 11 can be used with combustion systems such as sealed quench furnaces, glass industry annealing furnaces, continuous gas carburizing furnaces, pit carburizing furnaces and other furnaces.

Single-ended recuperative radiant tube assemblies having an outside diameter from about 4 inches to about 4½ inches are constructed and arranged similarly to single-ended recuperative radiant tube assemblies having an outside diameter of about 6 inches, except that the flame tube 100 is perforated from a point in front of the burner equal to four times the diameter of flame tube 100 to a point before the distal front end of flame tube 100 in an amount equal to about twice the diameter of flame tube 100. These perforations form exhaust apertures, holes or ports 200 in foraminous flame tube 100 through which hot exhaust gases can pass into annular exhaust passageway 126. This arrangement provides for uniform heat and gas exhaust release along the length of flame tube 100.

Additionally, the burner of single-ended recuperative radiant tube assemblies having an outside diameter between 4 and 4½ inches, has six gas-emitting discharge holes or burner apertures 202 in lieu of radial discharge gap 83. The combined area of the burner apertures 202 should be from about 3 percent to about 6 percent of the cross-sectional area of flame tube 100.

Furthermore, for single-ended recuperative radiant tube assemblies having an outside diameter between 4 and 4½ inches, there need not be a reduced diameter converging portion 92 about the burner because the velocity of the heated air for radiant tubes with such smaller outside diameters is sufficiently high to attain the desired degree of mixture with the gaseous fuel.

Figure 5:
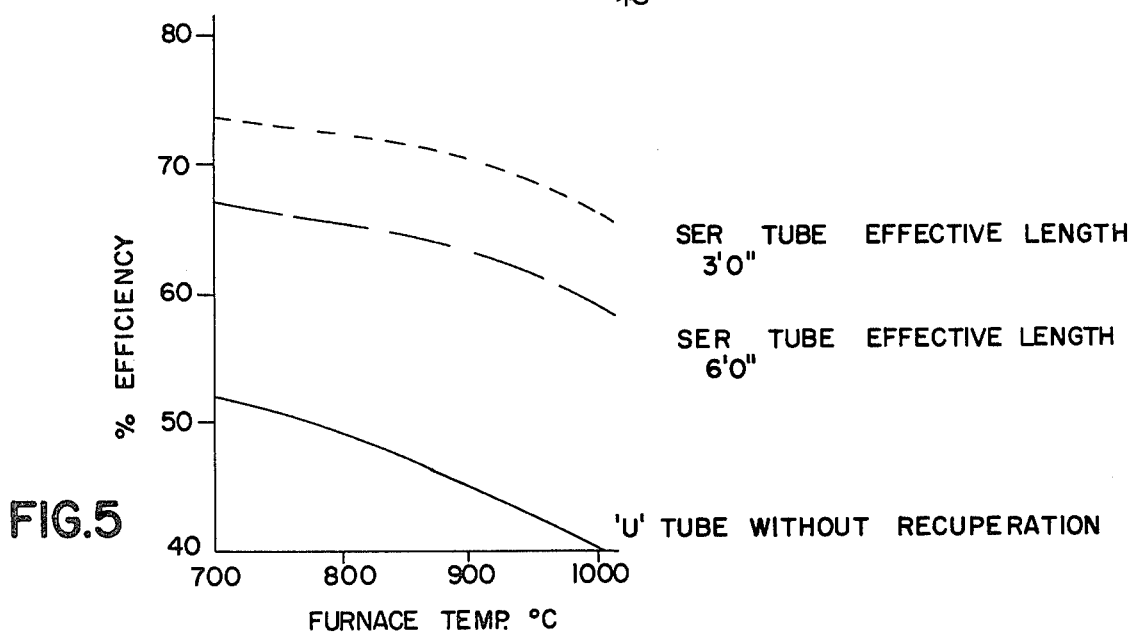
FIG. 5 is a graph showing the efficiency of single-ended recuperative radiant tube assemblies in comparison to a conventional radiant tube at different furnace temperatures.

The graph of FIG. 5 shows the efficiency of single-ended recuperative radiant tube assemblies (identified in the graph as "SER Tube") having effective lengths of 6 feet 6 inches and 3 feet at varying furnace temperatures at a dissipation rate of 50 btu/sq. inch in comparison with a standard U-shaped radiant tube. It can be seen from the graph of FIG. 5 that the efficiency of a single-ended recuperative radiant tube assembly having an effective length of 6 feet 6 inches is increased from under 50 percent to about 65 percent at 850 degrees C. and from about 40 percent to about 62 percent at 1000 degrees C. A single-ended recuperative radiant tube assembly having an effective length of 3 feet has an increased efficiency of about 71 percent at 850 degrees C. and to about 68 percent at 1000 degrees C.

Figure 6:
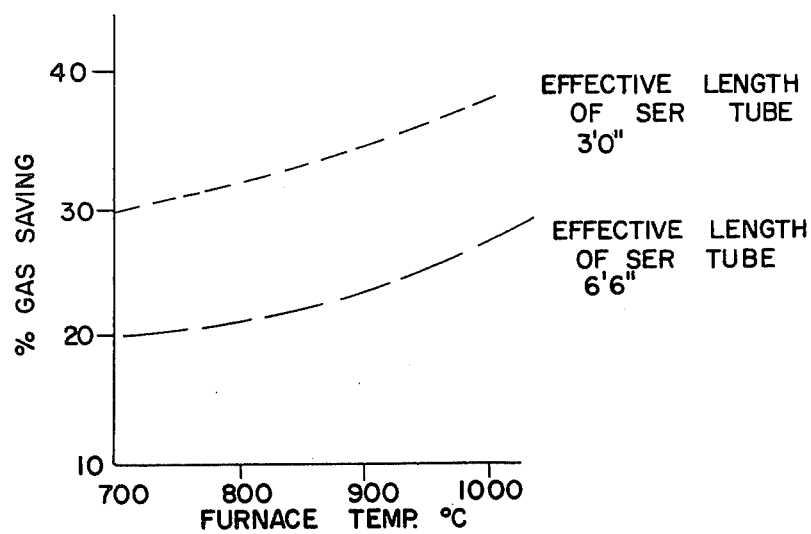
FIG. 6 is a graph illustrating the percentage gas savings with single-ended recuperative radiant tube assemblies.

The graph in FIG. 6 illustrates gas savings of single-ended recuperative radiant tube assemblies (identified in the graph as "SER Tube") having effective lengths of 6 feet 6 inches and 3 feet. It can be seen from the graph of FIG. 6 that a single-ended recuperative radiant tube assembly having an effective length of 6 feet 6 inches will have a gas savings of about 20 percent at 700 degrees C. and about 26 percent at 1000 degrees C. A single-ended recuperative radiant tube assembly having an effective length of 3 feet has a gas savings of about 30 percent at 700 degrees C. and about 38 percent at 1000 degrees C.

Although embodiments of the invention have been shown and described, it is to be understood that various modifications and substitutions can be performed by those skilled in the art without departing from the novel spirit and scope of this invention.

What is claimed is:

1. A single-ended recuperative radiant tube assembly, comprising: a burner, fuel means connected to said burner for feeding fuel to said burner, air means connected to said burner for feeding air to said burner and mixing with said fuel, exhaust means for receiving hot exhaust gases from said burner including a flame tube positioned downstream of said burner, said exhaust means defining an exhaust chamber operatively positioned adjacent and cooperating with said air means for heating the air in said air means before said air reaches said burner, and means for shielding said fuel means for protecting said fuel means from overheating, said air means and said burner together defining an annular, non-converging air passage, said burner including a plurality of turbulence inducing fins extending radially across said annular, non-converging air passage to said air means for creating swirling airflow, said burner further including at least one generally radially extending discharge opening through which fuel flows into the central portion of said swirling airflow, said discharge opening being closely associated with said turbulence inducing fins for enhancing progressive combustion by said burner within said flame tube.

2. A single-ended recuperative radiant tube assembly in accordance with claim 1 further including velocity increasing means for increasing the velocity of said heated air before said heated air reaches said burner.

3. A single-ended recuperative radiant tube assembly in accordance with claim 1 wherein said shielding means comprises a chamber between said air means and said fuel means.

4. A single-ended recuperative radiant tube assembly, comprising: radiant tube means, a burner positioned within said radiant tube means, fuel means for feeding fuel to said burner, outer recuperator tube means positioned generally about said burner and defining an inner exhaust flow passageway for receiving exhaust gases from said burner, said outer recuperator tube means operatively positioned within and cooperating with said radiant tube means for defining an annular exhaust chamber communicating with said inner exhaust flow passageway, and inner recuperator tube means spaced inwardly of said outer recuperator tube means and defining therewith an annular air chamber for feeding air to said burner, said annular air chamber operatively positioned adjacent and cooperating with said annular exhaust chamber so that air passing through said annular air chamber is heated by the exhaust gases in said annular exhaust chamber before said air reaches said burner, said outer recuperator tube means including a non-converging, generally cylindrical swirling portion generally adjacent and spaced from said burner, said burner including a plurality of air swirling fins extending radially to said swirling portion for inducing swirling turbulence in air heated within said annular air chamber before the air is mixed with fuel, said burner further including at least one radially extending discharge opening through which fuel flows closely associated with said fins for enhancing progressive combustion within said inner exhaust flow passageway.

5. A single-ended recuperative radiant tube assembly in accordance with claim 4 wherein said outer recuperator tube means includes a flame tube positioned downstream of said burner.

6. A single-ended recuperative radiant tube assembly in accordance with claim 5 wherein said flame tube defines a plurality of exhaust apertures in communication with said annular exhaust chamber.

7. A single-ended recuperative radiant tube assembly in accordance with claim 6 wherein said flame tube has one end positioned in proximity to said burner and a distal end positioned remote from said burner, and said exhaust apertures are defined by said flame tube between a first position and a second position, said first position spaced from said burner a distance of about quadruple the diameter of said flame tube and said second position spaced from said distal end of said flame tube a distance of about twice the diameter of said flame tube.

8. A single-ended recuperative radiant tube assembly in accordance with claim 4 wherein said fuel means includes fuel inlet line means positioned within said inner recuperator tube means for feeding fuel to said burner and said inner recuperator tube means provides a shield for preventing heated air in said annular air chamber from overheating said fuel in said fuel inlet line means to substantially prevent the formation of soot at said burner.

9. A single-ended recuperative radiant tube assembly in accordance with claim 4 wherein said annular exhaust chamber has a cross-sectional area from about 25 percent to about 35 percent of the cross-sectional area of said radiant tube means.

10. A single-ended recuperative radiant tube assembly in accordance with claim 4 wherein said annular air chamber has a cross-sectional area from about 20 percent to about 30 percent of the cross-sectional area of said outer recuperator tube means.

11. A single-ended recuperative radiant tube assembly in accordance with claim 4, said discharge opening through which said fuel flows having a combined area from about 3 percent to about 6 percent of the cross-sectional area of said outer recuperator tube means.

12. A single-ended recuperative radiant tube assembly in accordance with claim 4 wherein said discharge opening through which said fuel flows spans a distance of about 0.75 percent of the effective length of said radiant tube means.

13. A single-ended recuperative radiant tube assembly in accordance with claim 4 wherein said annular exhaust chamber and said annular air chamber are positioned in counterflow arrangement with each other so that exhaust gases flowing in said annular exhaust chamber travel in a direction generally opposite the flow of air in said annular air chamber.

14. A single-ended recuperative radiant tube assembly in accordance with claim 4, and air inlet means comprising an annular inlet air chamber communicating with said annular air chamber.

15. A single-ended recuperative radiant tube assembly in accordance with claim 14, and exhaust outlet means for receiving exhaust gases from said annular exhaust chamber, said exhaust outlet means being positioned between said annular inlet air chamber and said burner.

16. A single-ended recuperative radiant tube assembly in accordance with claim 4, including a generally converging portion positioned upstream of said burner for increasing the velocity of said heated air and for directing said heated air toward said burner.

17. A single-ended recuperative radiant tube assembly in accordance with claims 1 or 4, wherein said discharge opening is positioned immediately adjacent to and downstream of said fins.

18. A single-ended recuperative radiant tube assembly in accordance with claims 1 or 4, wherein said discharge opening is positioned intermediate adjacent ones of said fins.

19. A single-ended recuperative radiant tube assembly, comprising: radiant tube means, a burner, fuel means for feeding fuel to said burner, outer recuperator tube means positioned generally about said burner and defining an inner exhaust flow passageway for receiving exhaust gases from said burner, said outer recuperator tube means operatively positioned within and cooperating with said radiant tube means for defining an annular exhaust chamber communicating with said inner exhaust flow passageway, an annular air chamber operatively positioned adjacent and cooperating with said annular exhaust chamber so that air passing through said annular air chamber is heated by the exhaust gases in said annular exhaust chamber before said air reaches said burner, said outer recuperator tube means including a generally converging portion positioned upstream of said burner for increasing the velocity of said heated air and directing said heated air towards said burner, and swirling turbulence inducing means positioned downstream of said converging portion within a non-converging portion defined by said outer recuperator tube means for creating swirling turbulence within said heated air prior to mixing of said heated air with said fuel, said burner including radially extending fuel discharge means closely associated with said turbulence inducing means for enhancing progressive combustion by said burner within said inner exhaust flow passageway.

20. A single-ended recuperative radiant tube assembly in accordance with claim 19 wherein said turbulence inducing means includes a plurality of fins for enhancing turbulence of said heated air before said heated air is mixed with said fuel.

21. A method of increasing the efficiency of a furnace combustion system, comprising the steps of:

providing a single-ended recuperative radiant tube assembly, emitting exhaust gases into a flame tube from a burner within said single-ended recuperative radiant tube assembly, heating air with said emitted exhaust gases within said single-ended recuperative radiant tube assembly, directing said heated air to said burner, and shielding fuel fed to said burner from said heated air, swirling said heated air by passage through a non-converging swirling portion disposed about said burner by providing said burner with a plurality of radially extending fins which extend to said non-converging swirling portion, and mixing fuel with said swirling heated air by radial discharge of the fuel into the central portion of said swirling heated air through at least one discharge opening of said burner closely associated with said fins for enhancing progressive combustion of said burner within said flame tube.

22. A method of increasing the efficiency of a furnace combustion system in accordance with claim 21 including the step of increasing the velocity of said heated air in said single-ended recuperative radiant tube assembly before said heated air reaches said burner.

23. A method of increasing the efficiency of a furnace combustion system in accordance with claim 21 including the step of directing said heated air in said single-ended recuperative radiant tube assembly in counter-flow movement to the direction of travel of some of said exhaust gases.

* * * * *